United States Patent [19]

Forster

[11] 4,024,960

[45] May 24, 1977

[54] APPARATUS FOR ELEVATING WHEELED VEHICLE

[75] Inventor: Brian Michael Forster, Sheffield, England

[73] Assignee: GKN Transmissions Limited, Erdington, England

[22] Filed: May 1, 1975

[21] Appl. No.: 574,380

[52] U.S. Cl. .............................. 214/1 A; 187/8.49; 187/8.52

[51] Int. Cl.² .......................................... B60P 1/04

[58] Field of Search .......... 214/1 R, 1 D, 1 A, 103, 214/104, 624, 700, 704, 702, 705; 187/8.41, 8.49, 8.52; 254/3 R, 3 B, 3 C, 93 L, 93 A, 101

[56] References Cited

UNITED STATES PATENTS

| | | | |
|---|---|---|---|
| 1,290,267 | 1/1919 | McFarland | 214/1 A X |
| 1,413,143 | 4/1922 | Thomas | 187/8.41 |
| 1,525,447 | 2/1925 | Hose | 214/1 A X |
| 2,593,635 | 4/1952 | Walker | 187/8.41 X |
| 2,721,740 | 10/1955 | Skelley | 214/1 A X |
| 2,857,985 | 10/1958 | Simmons, Sr. | 187/8.41 |
| 3,094,192 | 6/1963 | McAlpine | 187/8.41 X |
| 3,467,261 | 9/1969 | Jewell | 214/1 SW |
| 3,804,206 | 4/1974 | Bubik | 187/8.52 |
| 3,884,362 | 5/1975 | Brenner | 214/1 Q |

FOREIGN PATENTS OR APPLICATIONS

| | | | |
|---|---|---|---|
| 933,587 | 9/1955 | Germany | 214/1 A |
| 79,924 | 11/1955 | Netherlands | 187/8.41 |
| 1,329,068 | 9/1973 | United Kingdom | |
| 211,772 | 4/1968 | U.S.S.R. | 187/8.41 |

*Primary Examiner*—Frank E. Werner
*Attorney, Agent, or Firm*—Watson, Cole, Grindle & Watson

[57] ABSTRACT

Apparatus for elevating and supporting a wheeled vehicle comprises a vehicle receiving platform, and supporting means for the platform providing for angular movement of the platform in a vertical plane extending longitudinally of the vehicle. One position of the platform is arranged so that the vehicle can be driven on its own wheels onto and off the platform. The support means includes a member which supports the platform in the mid region of the length of the platform, elevator means being provided for raising and lowering such member and thus moving the platform from a horizontal loading position to an inclined working position, the platform being pivotally supported at opposite ends about horizontal axes transverse to the length of the platform.

5 Claims, 10 Drawing Figures

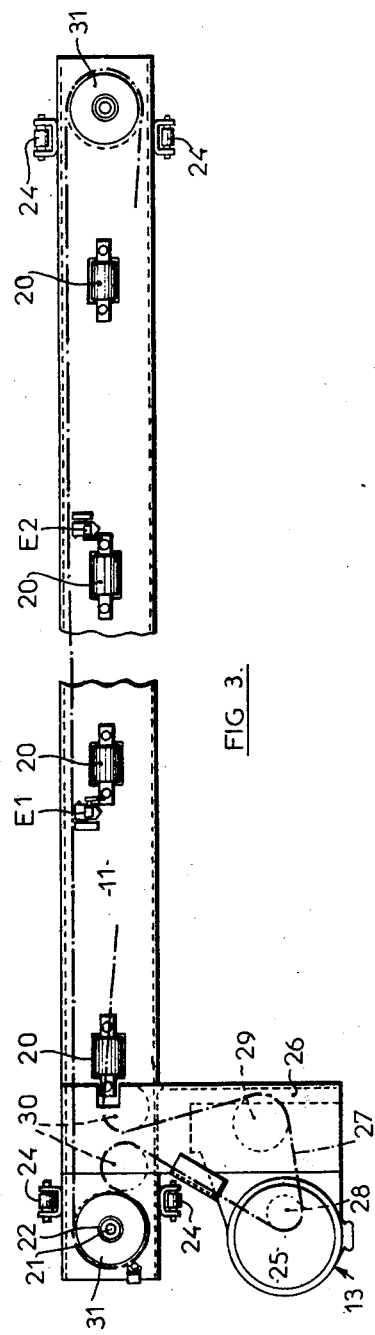

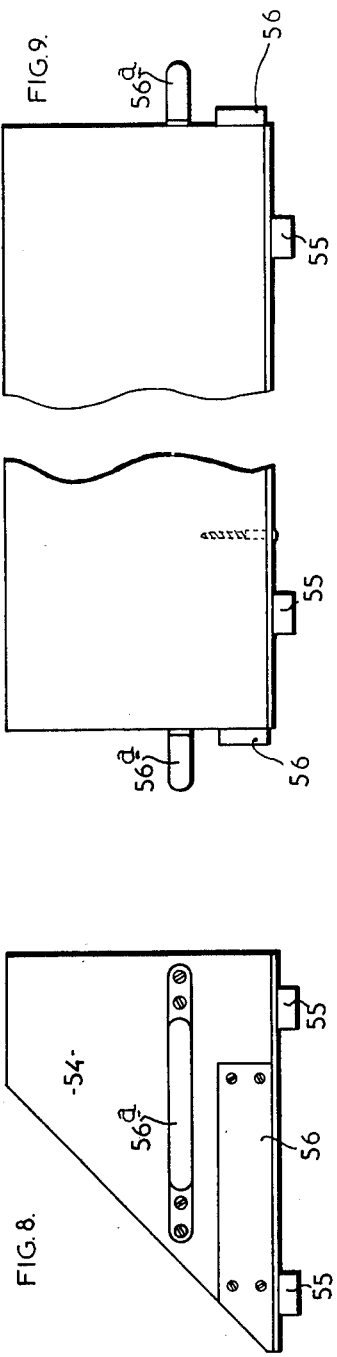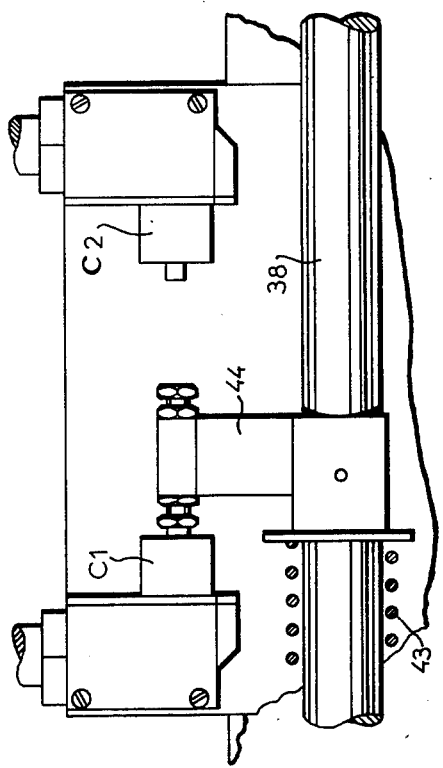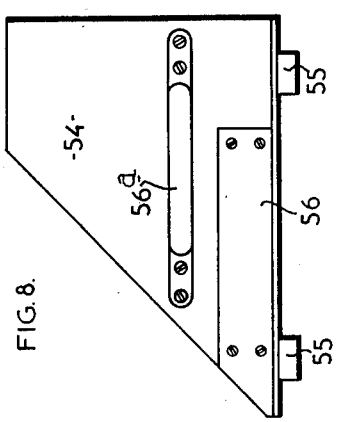

4,024,960

APPARATUS FOR ELEVATING WHEELED VEHICLE

BACKGROUND OF THE INVENTION

1. Field of the Invention

This invention relates to apparatus for elevating wheeled vehicles. The invention has been developed primarily for elevating self-propelled vehicles, such as motor cars, motor vans and lorries but may be employed for elevating wheeled trailer vehicles if desired.

2. Description of the Prior Art

In one conventional form of such apparatus the apparatus comprises a platform onto and off which the vehicle can be driven or otherwise moved on its own wheels when the platform is in a lowered loading position in which it is horizontal and flush, or approximately flush, to the ground or a floor surface, and the apparatus further comprises power energised elevator, for example a single hydraulic jack disposed centrally of the platform for elevating it to a raised working position.

The requirement to provide an elevating means such as a hydraulic jack which affords a stroke equal to the height through which the platform is required to be raised, as well as the necessity for excavating the floor or ground to provide a well for accommodating such jack, contributes materially to the cost of such apparatus and its installation. The first of these factors is also applicable where the power energised elevating means comprises more than one jack, whether hydraulic or mechanical, disposed adjacent to, but outside, the perimeter of the platform as, for example, where four such jacks are provided adjacent to the corners of a generally rectangular platform, or where two such jacks are provided adjacent to opposite sides.

SUMMARY OF THE INVENTION

The object of the present invention is to provide a new or improved form of apparatus for elevating wheeled vehicles in which one or both of the above mentioned factors contributing significantly to the cost of manufacture and installation are avoided or reduced.

The apparatus in accordance with the invention is based on the concept that in a member of cases it is unnecessary to have access simultaneously to the underside of a vehicle throughout its length, and that simplification and reduction in cost of manufacture of the apparatus can be achieved while meeting the essential requirements of access for servicing and repair work provided that one end, or both ends in turn, of the vehicle can be raised to the requisite height.

According to the invention there is provided an apparatus for supporting a wheeled vehicle in an elevated position comprising a vehicle receiving platform, and supporting means for the platform providing for controlled angular movement thereof, in a vertical plane extending longitudinally of the vehicle when on the platform, into a plurality of different angular positions including one selected to allow movement of the vehicle on its own wheels onto and off the platform, the support means comprising a member providing support for the platform in the mid region of the length of the platform, and elevator means is provided operable to raise and lower said member and thereby move the platform from a substantially horizontal lowered loading position to an inclined working position.

In one such arrangement the supporting means may further comprise bearer means at opposite ends of the platform providing pivotal support for the platform about respective horizontal axes transverse to the length of the platform and situated adjacent to said ends respectively, there being provided in association with the platform and said bearer means respective hold-down means at each end of the platform each settable in a retaining position to prevent upward movement of the associated end of the platform, or a releasing position permitting of said upward movement, the arrangement being such that the elevator means can be operated to raise the platform only when the hold-down means at one end only of the platform is in its retaining position.

A further feature of the invention is that the apparatus may comprise wheel chock elements for placing on the platform to oppose descent of the vehicle when the platform is in its inclined working position, and further comprise sensing means for sensing the presence of the chock elements in operative wheel chocking positions and furnishing a signal controlling operation of the elevator means and/or a warning means as a safeguard against raising of the platform from its loading position to its working position without the chocks in their operative wheel chocking positions.

In cases where the angular movement of the platform between its loading and working positions is brought about by raising and lowering of the member of the supporting means providing support to the platform in its mid region, reduction in the cost of manufacture is achieved by virtue of the fact that the elevator means need only have a stroke or travel which is one half of that which would be required in the case of a conventional apparatus for elevating wheeled vehicles where the platform remains horizontal during its travel between the loading and working positions. Further, it is not necessary for any excavation of the ground or floor surface to be performed.

BRIEF DESCRIPTION OF DRAWINGS

The invention will now be described, by way of example, with reference to the accompanying drawings wherein:

FIG. 3 is a plan view of part of the supporting means for furnishing support to the platform in the mid region of its length;

FIG. 4 is a fragmentary view in transverse vertical cross-section on the line 4—4 of FIG. 2 through one of the trackway members of the platform and one of the bearers supporting same at one end of the platform;

FIG. 5 is a fragmentary plan view showing part of the hold-down means and interlock means associated with the bearer and hold-down means illustrated in FIG. 4;

FIGS. 8 and 9 are respectively views in side elevation and end elevation of one of the larger sized wheel chock elements.

DESCRIPTION OF PREFERRED EMBODIMENT

Figure 1:
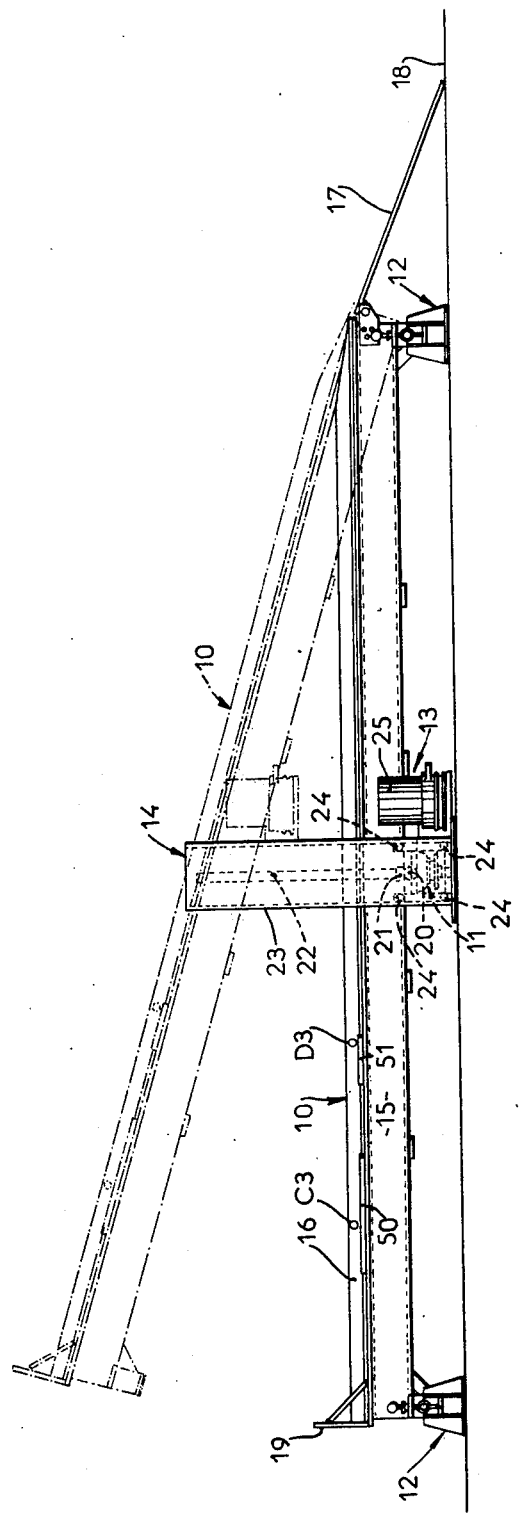
FIG. 1 is a view in side elevation of one embodiment of apparatus for elevating wheeled vehicles in accordance with the invention.
Figure 2:
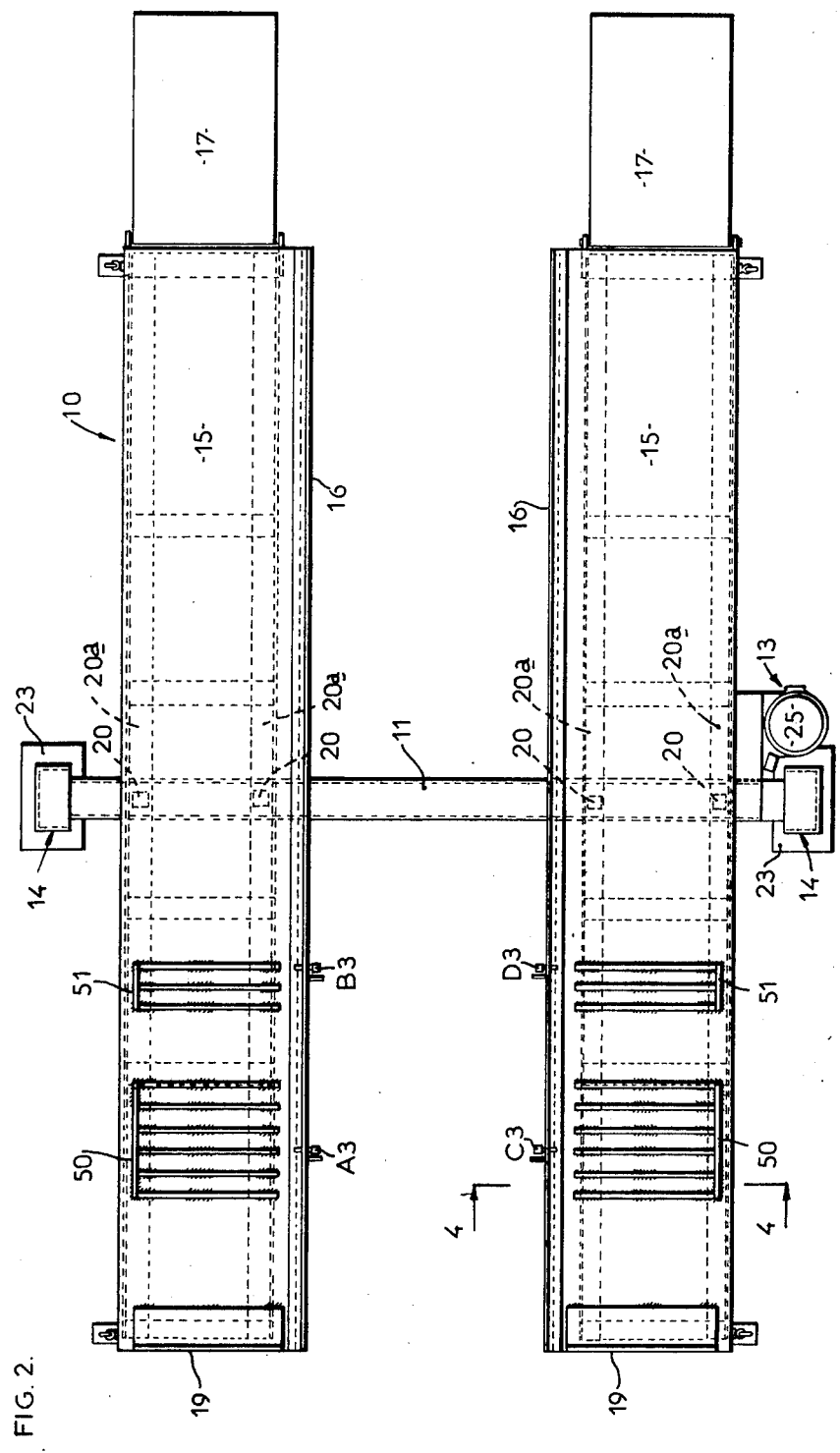
FIG. 2 is a plan view.

The apparatus comprises a platform 10 and a supporting means which includes a beam 11 extending transversely of the platform therebeneath in the mid region of its length and two bearers 12, one at each end of the platform. The beam 11 can be raised and lowered by power energised elevator means 13 which includes a pair of laterally spaced screw and nut type jacks or elevators 14, one at each side of the platform.

The platform itself comprises two trackway members 15 on which the wheels of the vehicle to be supported can rest each having a flange 16 along its inner longitudinal edge or, if desired, along both edges. At one end each trackway member is provided with a ramp plate 17 to enable the vehicle to be moved onto and off the platform on its wheels, either by driving, towing or pushing, the platform at this time being in the lowered loading position illustrated in full lines in FIG. 1 and in which it is situated at only a short distance above the level of the floor surface 18, typically one foot or thereabouts.

When elevated to its working position, as seen in broken lines in FIG. 1, one end of the platform is raised to a distance sufficient to provide access to the underside of the vehicle adjacent to this end and this height may typically be six feet or thereabouts. Movement of the vehicle on its wheels onto and off platform may be effected from one end only as seen in the embodiment illustrated, in which case the trackway members 15 are preferably provided at the ends opposite the ramp plates 17 with upstanding fences 19, but it would be possible to omit the fences 19 and provide ramp plates 17 at both ends if required.

Referring now to FIG. 3 which show the beam 11 and the power energised elevating means in more detail, the beam 11 is provided at its upper side with rollers 20 for engaging a plate 20a at the underside of each trackway member. The ends of the beam project laterally outwardly of the platform and carry rotatable nuts 21 cooperative with externally screw-threaded posts 22 contained in vertical channel-section housings 23, the inner faces of which are engaged by guide rollers 24 at the ends of the beam 11.

For rotating the nuts 21, drive is provided from an elevator motor 25 carried on a mounting plate 26 by way of a sprocket chain 27 engaged round a sprocket 28 driven from the motor 25 and passing around guide sprockets 29 and 30 and around driven sprockets 31 at opposite ends of the beam.

Since the beam is not connected to each trackway member but merely affords support to the underside of the latter, it would be possible, during lowering of the beam, for either trackway member to fail to descend due to some obstruction and thereby give rise to considerable lateral tilt of the vehicle. To safeguard against this possibility sensing means are provided in the form of microswitches E1, E2 which are normally maintained in closed positions by contact with the undersides of respective plates 20a of trackway members but which are opened if such contact is lost. These switches are connected in an interlock circuit, hereinafter described, which will serve to cut off current to the elevator motor 25 during descent should the condition described above rise.

Figure 6:
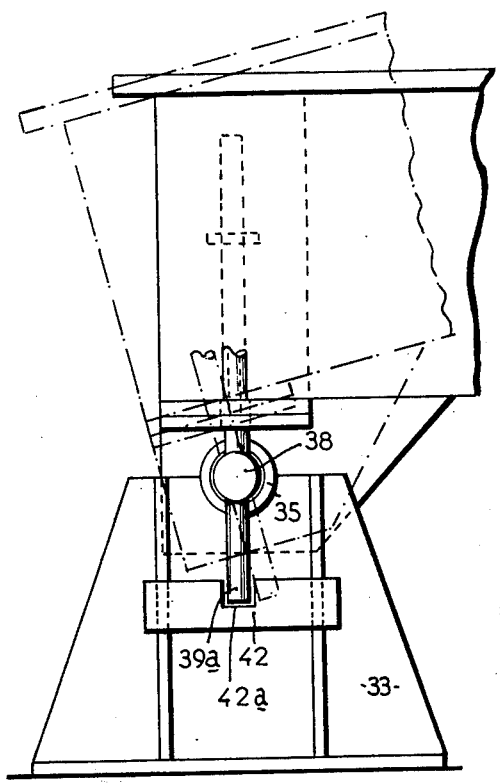
FIG. 6 is a fragmentary view in side elevation illustrating a further mechanical part of the interlock means.

Referring now to FIG. 4, 5 and 6 which show the arrangement of bearer means and a hold-down means associated therewith, such bearer means comprises for each trackway member at each end of pedestal 33 formed at its upper end with a cradle 34 for receiving a tubular pivot bush 35 secured to the underside of the platform member 15 at each side thereof.

The pedestal 33 includes an upstanding bracket 36 of plate-like form which projects into the space between two downwardly extending plates 37 secured to the underside of the trackway member. In the lowered loading position of the latter holes in the bracket 36 and in the plates 37 are on horizontal alignment with each other and are coaxial with the axis about which the tubular bushes 35 can pivot in the cradle 34. The hold-down means comprises an elongated bolt member in the form of a rod 38 which is slidable axially through one of the bushes 35 and is movable from an operative bolting position as shown in FIG. 5 in which its inner end is engaged through the aligned holes in the bracket 36 and the plates 37 to a releasing position shown in broken lines in which such end is withdrawn from the holes that the plates 37, and hence the trackway member, are free to rise relatively to the bracket 36 and the bearer 12 as a whole.

The rod 38 is movable between the operative and releasing positions by means of an operating handle 39 fixed to the outer end of the rod which projects upwardly through a guide slot in a gate plate 40, such slot including longitudinally spaced sockets or enlargements for receiving the lower end of a downwardly spring loaded locking bush 41.

By virtue of the engagement of the lever 39 in the slot of the gate plate 40, such lever will be moved angularly with the rod 38 when ever the trackway member moves angularly from its lowered loading position to its raised working position, and the lower end or trail 39a of the lever is thus brought out of registration of a slot 42a in a plate 42 secured to the bearer.

This ensures that the rod 38 can be moved between its operative and releasing positions only when the associated trackway member is in its lowered loading position.

As seen particularly in FIG. 4, the rod 38 which may be urged towards its releasing position by a spring 43 carries switch operating arm 44 for operating two microswitches C1 and C2 mounted on the trackway member at the underside thereof, and which are included in the interlock circuit hereinafter described.

It will be understood that a rod such as 38 and associated switches is provided for each trackway member at each end thereof so that, in all, there will be four rods 38 and eight switches.

As an additional safety measure, chock elements are provided for placing on the platform in operative wheel chocking positions. The trackway members which constitute the platform are designed to receive chock elements of two kinds, namely a large size and a small size, and collectively these provide for restraint of descent of vehicles having a range of wheel base lengths and a range of wheel sizes.

Figure 7:
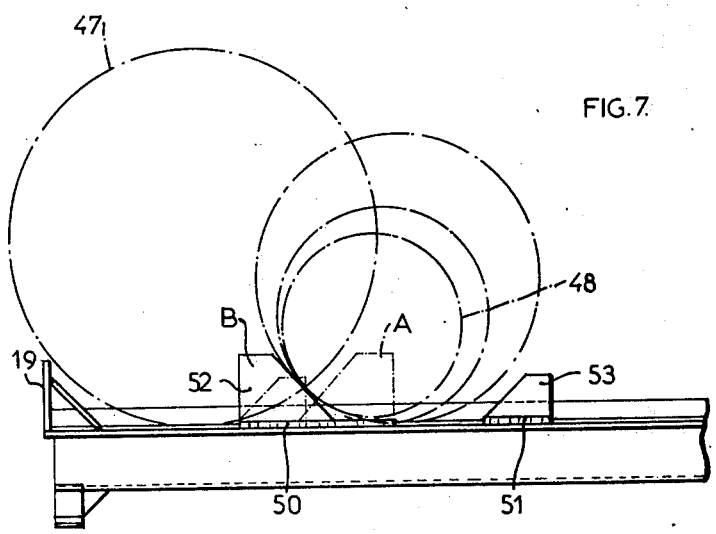
FIG. 7 is a diagrammatic view in side elevation showing the arrangement of wheel chock elements on the platform in relation to the wheels of vehicles of differing wheel base and wheel size.

In FIG. 7 there is illustrated diagrammatically the placement of these chock elements for chocking wheels 47 of large diameter, for example 39 inches, and wheels 48 of small diameter, for example 20 inches, it being understood that the reference herein is to the outside diameter of the type carried by the wheel.

As arranged in the embodiment shown, the trackway members provide positions for placement of the chock elements for chocking only the front pair of wheels of the vehicle, the latter being moved to a position such that the front pair of wheels will lie closely adjacent to, or will abut, the fences 19 of the trackway members.

Adjacent to this end of the trackway members the wheel supporting surface thereof is slotted transversely to provide grids 50 and 51 respectively for receiving two types of chock element, namely a larger size 52 and a smaller size 53.

Both sizes are of generally similar form and therefore only the larger size is illustrated in FIGS. 8 and 9 from which it will be noted that each chock element comprises a body 54 of wedge shape as seen is side elevation provided at its underside with downwardly projecting bosses 55, typically, four in number, the front pair positioned for engaging to one of the spaces between the bars of the associated grid and the rearward engaging in another of the spaces.

The side faces of the block are provided with swtich operating projections 56 and microswitches A3 and D3 are provided on the trackway member. Lifting handles 56a are also provided.

When employing the apparatus for elevating a vehicle of relatively long wheel base having larger diameter wheels, the front wheels would normally be positioned closely adjacent to, or in contact with, the fences 19 and the large chock elements would be placed in positions at the rear of the wheels, as indicated at A, the downwardly projecting bosses 55 engaging through spaces between the bars of the grid 50 such that the sloping or wedge surface of the chock element is in contact with, or closely adjacent to, the tread surface of the type of the wheel 47. The small chock 53 would be placed in any suitable position on the grid 51 where it would operate the associated microswitch $C_3$ or $D_3$ as the case may be.

For a shorter wheel base vehicle, the vehicle would be driven or moved onto the platform so that its front wheels occupied a position as shown for the wheels 48 such that the grid 50 has a portion extending forwardly of the wheels and the grid 51 lies to the rear of these wheels. The large chocks would then be placed in the position B with their sloping or wedge faces in contact with the forwardly presented tread face of type and the small chocks 53 would occupy a position behind the wheel as shown with the downardly projecting bosses engaging in those spaces of the grid which bring the chock as near as possible to the tread surface of the type.

It would be possible to provide similar chock elements for chocking the rear pair of wheels of the vehicle and in this case the grids would be provided on the trackway members adjacent to the rearward ends thereof in a manner similar to those provided at the forward end.

Figure 10:
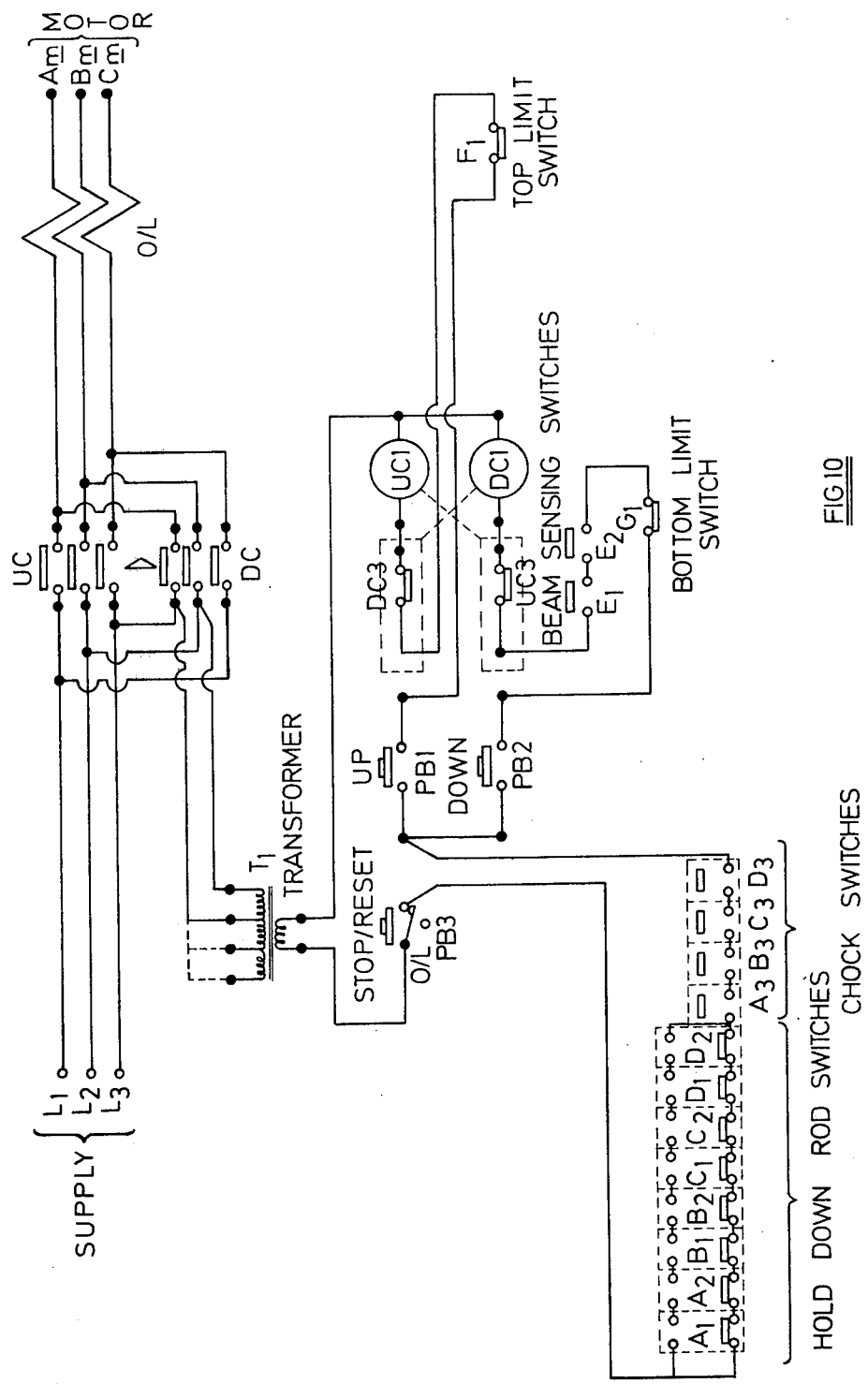
FIG. 10 is a circuit diagram of the interlock means.

Referring now to the interlock means shown in the circuit of FIG. 10, the supply of current (three phase) from input terminals L1, L2, L3 to motor terminals Am, Em, Cm is effected through a reversing switch system comprising contactor UC for rotating the motor in the elevating or up direction and contractor DC for rotating the motor in a descending or down direction, the circuit to the motor further containing an overload device O/L re-settable by push button PB3. The contactors UC and DC are operated by windings UC1, DC1 connected in the interlock circuit which is powered from the secondary winding of a step-down transformer T1 providing a low voltage output at its secondary winding, typically 24 volts.

Interlock switches associated with the hold-down means for the forward end of one trackway member are designated A1, A2, for the forward end of the other trackway member C1, C2, for the rearward end of the first said trackway member B1, B2, and for the rearward end of the second said trackway member D1, D2.

The switches operated by the large chock elements on a two trackway members respectively are designated A3, C3 and those operated by the small chock elements on the corresponding trackway members are designated B3, D3 respectively. The sensing switches on the beams are designated E1, E2 and top and bottom limit switches F1, G1 respectively.

The switches in the group A1 to D2 are shown in the positions occupied when the hold-down rods 38 are in the operative positions at the forward ends of the trackway members and in releasing positions at the rearward ends of the trackway members. The switches in the group A3 to D3 are shown in the positions occupied when the chock elements are not in their operative positions on the grids of the trackway members.

To bring the apparatus into operation, the vehicle would be driven or otherwise moved onto the trackway members and the chock elements 52 and 53 would be placed in appropriate positions thereby closing all switches in the group A3 to D3. The hold-down rods 38 may be placed in their operative positions as the vehicle is driven or moved onto the trackway members, although it is not essential that this should be done since the trackway members will be supported stably by means of the pedestals. The hold-down rods 38 would then be withdrawn from their releasing positions at the ends of the trackway members which it is required to elevate, for example the rearward ends remote from the fences 19, thereby placing switches A1 to D2 in the positions shown in FIG. 10.

The normally open "up" press button PB1 would then be depressed to complete a circuit from the secondary winding of transformer T1 through the operating winding UC1, thereby causing the motor to be energised for rotation in the up direction. At the limit of upward travel the top limit switch F1 would be opened to de-energise the motor. For descent the "down" push button PB2 would be depressed to complete a circuit of the secondary winding of transformer T1 through the operating winding DC1, thereby energising the motor for rotation in the "down" direction. This circuit would include switches E1, E2 which would be closed so long as both trackway members are in contact with the beam 11. The opening of either switch E1, E2 would stop the motor.

The latter would normally be stopped at the lower limit of travel, i.e. when the trackway members rest on the pedestals, by opening of the bottom limit switch G1. The operating windings UC1, DC1 serve to open normally closed contacts UC3 and DC3 as a safeguard against simultaneous energisation of the operating windings.

Although it is preferred that the interlock means should positively inhibit operation of the elevator motor as described, a possible alternative within the scope of the invention would be for the interlock circuit to provide an output signal for operating a warning device such as a bell, buzzer, flashing lamp or the like, either in substitution for controlling the elevator motor or additionally thereto.

I claim:

1. Apparatus for supporting a wheeled vehicle in an elevated position, comprising:
   a vehicle receiving platform;
   a member providing support for said platform in the mid region of the length therof;
   elevator means operable to raise and lower said member for moving said platform from a substantially horizontal lowered loading position to an inclined working position;
   bearer means providing pivotal support for said platform about respective horizontal axes transverse to the length thereof and situated adjacent to the ends of said platform;
   respective hold-down means for each of said bearer means, each including a holding member settable to a retaining position for preventing upward movement of the associated end of said platform, and a releasing position permitting movement of the associated end of said platform; and
   means associated with each holding member for preventing movement of the latter from its retaining position to its releasing position unless said platform is in its lowered loading position.

2. Apparatus as in claim 1 wherein each hold-down means comprises:
   a bolt member;
   means mounting said bolt member on said platform for sliding movement transversely thereof between a retaining position establishing a bolted relation with said bearer means and a releasing position with such bolted relation disabled;
   a handle on said bolt member, such handle undergoing angular movement with said platform when the latter moves between its loading and working position; and
   a plate member associated with said bearer means and including a slot with which said handle cooperates, for blocking movement of said handle transversely of said platform when said platform is in positions other than said loading position.

3. Apparatus as in claim 1 wherein said vehicle receiving platform comprises laterally spaced trackway members;
   said member providing support for said platform comprises a beam extending transversely beneath said trackway members;
   guide means for constraining said beam from vertical movement; and
   support means for supporting said trackway members individually on said beam and permitting movement of said trackway members longitudinally thereof relative to said beam and generally upward movement of said trackway members away from said beam.

4. Apparatus as in claim 3 wherein said beam includes rollers on its upper side constituting said support means, each said trackway member includes a plate on its underside for engagement with a respective roller.

5. Apparatus as in claim 3 further comprising sensing means for sensing lack of support of said trackway members by said support means, and for generating a signal for controlling said elevator means.

* * * * *